(12) United States Patent
Arnold et al.

(10) Patent No.: US 6,649,547 B1
(45) Date of Patent: Nov. 18, 2003

(54) INTEGRATED NONWOVEN LAMINATE MATERIAL

(75) Inventors: Billy Dean Arnold, Alpharetta, GA (US); Michael Lawrence Gross, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 204 days.

(21) Appl. No.: 09/653,470

(22) Filed: Aug. 31, 2000

(51) Int. Cl.[7] .............................. B32B 5/26; B32B 7/02; D04H 5/00; D04H 5/06
(52) U.S. Cl. ..................... 442/345; 442/340; 442/347; 442/350; 442/351; 442/363; 442/364; 442/382; 442/389; 442/400; 442/401; 428/218
(58) Field of Search ................... 442/340, 345, 442/346, 350, 351, 352, 353, 358, 359, 382, 389, 400, 401, 347, 363, 364; 428/218, 219

(56) References Cited

U.S. PATENT DOCUMENTS

| | | |
|---|---|---|
| 3,338,992 A | 8/1967 | Kinney |
| 3,341,394 A | 9/1967 | Kinney |

(List continued on next page.)

FOREIGN PATENT DOCUMENTS

| | | | |
|---|---|---|---|
| EP | 0 564 799 | 10/1993 | |
| EP | 0 960 645 | 12/1999 | |
| GB | 1 425 587 | 2/1976 | |
| WO | 97/23246 | 7/1997 | |
| WO | 97/23267 | 7/1997 | |
| WO | WO 97/44509 | 11/1997 | ............. D01F/1/10 |
| WO | WO 00/00267 | 1/2000 | ............. B01D/39/00 |
| WO | WO 00/28123 | 5/2000 | ............. D04H/3/16 |
| WO | 01/90464 | 11/2001 | |

*Primary Examiner*—Cheryl A. Juska
*Assistant Examiner*—Jenna-Leigh Befumo
(74) *Attorney, Agent, or Firm*—Pauley Petersen & Erickson (57) ABSTRACT

An integrated nonwoven laminate material suitable for use as a filter medium having a microfiber layer integrated with a low loft multicomponent spunbond layer and a high loft multicomponent spunbond layer and a method of producing the integrated nonwoven laminate material. In one embodiment of this invention, a laminate material is through-air bonded to form an integrated nonwoven laminate material which is then electret treated to enhance attraction between particles being filtered and the fibers of the integrated nonwoven laminate material. In one embodiment of this invention, the integrated nonwoven laminate material is used as a filter having an ASHRAE Standard 52.1-1992 Dust Spot Efficiency of about 40% to about 95% and an ASHRAE Standard 52.2-1999 MERV (Minimum Efficiency Reporting Value) of 12 to 16.

36 Claims, 3 Drawing Sheets

U.S. PATENT DOCUMENTS

| | | |
|---|---|---|
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,215,682 A | 8/1980 | Kubik et al. |
| 4,340,563 A | 7/1982 | Appel et al. |
| 4,375,718 A | 3/1983 | Wadsworth et al. |
| 4,588,537 A | 5/1986 | Klaase et al. |
| 4,906,513 A | 3/1990 | Kebbell et al. |
| 4,917,942 A | 4/1990 | Winters |
| 5,108,820 A | 4/1992 | Kaneko et al. |
| 5,229,191 A | 7/1993 | Austin |
| 5,283,106 A | 2/1994 | Seiler et al. |
| 5,336,552 A | 8/1994 | Strack et al. |
| 5,382,400 A | 1/1995 | Pike et al. |
| 5,401,446 A | 3/1995 | Tsai et al. |
| 5,589,258 A | 12/1996 | Maddern et al. |
| 5,593,768 A | 1/1997 | Gessner |
| 5,622,772 A | 4/1997 | Stokes et al. |
| 5,667,544 A | 9/1997 | Haas et al. |
| 5,707,468 A | 1/1998 | Arnold et al. |
| 5,716,522 A | 2/1998 | Chilton et al. |
| 5,721,180 A | 2/1998 | Pike et al. |
| 5,820,645 A | 10/1998 | Murphy, Jr. |
| 5,824,611 A | 10/1998 | Eyler |
| 5,834,386 A | 11/1998 | Cohen |
| 5,855,992 A | 1/1999 | Etzold |
| 5,873,968 A | 2/1999 | Pike et al. |
| 5,883,026 A | 3/1999 | Reader et al. |
| 5,939,341 A * | 8/1999 | Brown et al. ............... 442/351 |
| 5,989,004 A | 11/1999 | Cook |
| 6,001,303 A | 12/1999 | Haynes et al. |

* cited by examiner

INTEGRATED NONWOVEN LAMINATE MATERIAL

BACKGROUND OF THE INVENTION

Filter media having large interfiber pores and, thus, a high permeability typically contain sparsely packed relatively thick fibers. Such filter media require relatively low driving pressure to provide adequate filtration throughput rate and service life. However, highly permeable filter media, e.g., residential glass fiber HVAC filters, only provide a low filtration efficiency in that the large interfiber pore structures of the media do not have interstitial configurations that are suitable for entrapping fine contaminant particles. Consequently, coarse fiber, highly permeable, filter media have not been used in fine particle filtration applications.

In contrast, microfiber nonwoven webs, such as meltblown fiber webs, have been used as fine particle filter media. The densely packed fine fibers of these webs provide fine interfiber pore structures that are highly suitable for mechanically trapping or screening fine particles. However, the fine pore structure of meltblown fiber webs and other similar microfiber webs that have densely packed fine fibers results in a low permeability, creating a high pressure drop across the webs. Consequently, the low permeability of fine fiber filter media requires a high driving pressure to establish an adequate filtration throughput rate. Further, as contaminants accumulate on the surface of the filter media, the contaminants quickly clog the small interfiber pores and further reduce the permeability of the media, thereby even further increasing the pressure drop across the media and rapidly shortening the service life.

Additionally, microfiber web filter media do not tend to have a physical integrity that is sufficient enough to be self-supporting. Although the physical integrity of microfiber filter media can be improved by increasing the basis weight or thickness of the web, the increased basis weight or thickness exacerbates the pressure drop across the filter media. As such, microfiber web filter media are typically laminated to a supporting layer or fitted in a rigid frame. However, the conventional supporting layer or rigid frame does not typically contribute to the filtration process and only increases the production cost of the filter media.

There remains a need for integrated filter media that provide combinations of desirable filter properties, including high filtration efficiency and particle retention, high permeability, low pressure drop, high throughput rate and long service life.

SUMMARY OF THE INVENTION

In response to the discussed difficulties and problems encountered in the prior art, an integrated nonwoven laminate material suitable for use as a filter has been discovered. The integrated nonwoven laminate material includes a microfiber layer, a low loft multicomponent spunbond layer on one side of the microfiber layer, and a high loft multicomponent spunbond layer on the other side of the microfiber layer. The low loft multicomponent spunbond layer provides support and strength as well as filtration efficiency to the integrated nonwoven laminate material. Desirably, the low loft multicomponent spunbond layer has a basis weight of about 33–170 gsm, more desirably about 67–102 gsm. It is also desirable that the low loft multicomponent spunbond layer has a bulk density of at least 0.05 g/cm$^3$, more desirably about 0.08 g/cm$^3$ to about 0.14 g/cm$^3$, still more desirably about 0.10 g/cm$^3$ to about 0.13 g/cm$^3$.

The high loft multicomponent spunbond layer acts as a prefiltration and dust entrapment layer as air enters the integrated nonwoven laminate material through the high loft multicomponent spunbond layer. The high loft multicomponent spunbond layer provides a structure for particulate accumulation, thus increasing the dust holding capacity and service life of the filter. As one example of a high loft material, crimped bicomponent spunbond fibers provide a higher loft relative to a low loft bicomponent spunbond layer. Desirably, the high loft multicomponent spunbond layer has a basis weight of about 33–170 gsm, more desirably about 67–102 gsm. It is also desirable that the high loft multicomponent spunbond layer has a bulk density less than 0.05 g/cm$^3$, more desirably about 0.015 g/cm$^3$ to about 0.035 g/cm$^3$, still more desirably about 0.02 g/cm$^3$ to about 0.03 g/cm$^3$.

In accordance with one embodiment of this invention, the multicomponent spunbond fibers of the low loft multicomponent spunbond layer and the high loft multicomponent spunbond layer are bicomponent spunbond fibers having a lower melting point polymer component and a higher melting point polymer component desirably arranged in a side-by-side or sheath/core configuration. The high loft bicomponent spunbond layer may have lofted shaped fibers for enhanced dust holding capacity.

The microfiber layer contains relatively closely distributed microfibers. Desirably, the microfiber layer has a basis weight of about 10–34 gsm, more desirably about 13–21 gsm. It is also desirable that the microfiber layer has a bulk density of at least 0.05 g/cm$^3$, more desirably about 0.08 g/cm$^3$ to about 0.14 g/cm$^3$, still more desirably about 0.10 g/cm$^3$ to about 0.13 g/cm$^3$. The microfiber layer may include a dual layer fiber web having a barrier layer and a bulky layer which results in a density gradient across the microfiber layer.

To produce an integrated nonwoven laminate material of this invention, the low loft multicomponent layer is formed, the microfiber layer is deposited onto the low loft multicomponent spunbond layer and the high loft multicomponent spunbond layer is deposited on the microfiber layer.

In accordance with one embodiment of this invention, the nonwoven laminate material having bicomponent spunbond fibers is then passed through a through-air bonding unit, wherein the nonwoven laminate material is heated to a temperature above the melting point of the lower melting point polymer component but below the melting point of the higher melting point polymer component, thereby causing the bicomponent fibers of adjacent layers to form interfiber bonds. As a result of the autogenous bonding of these bicomponent fibers, a single, cohesive integrated nonwoven laminate material is formed, which is suitable for use as a filter medium. In order to increase the attraction between particles being filtered and the filter fibers, any one or all of the layers of the integrated nonwoven laminate material may be electret treated (electretized), before or after the integrated nonwoven laminate material is formed. For example, the microfiber layer may be electret treated before it is deposited onto the low loft multicomponent spunbond layer.

With the foregoing in mind, it is a feature and advantage of the invention to provide an integrated nonwoven laminate material for filtration applications, which includes a microfiber layer disposed between a low loft multicomponent spunbond layer and a high loft multicomponent spunbond layer.

It is also a feature and advantage of the invention to provide a filter medium including the integrated nonwoven laminate material.

DEFINITIONS

The term "nonwoven fabric or web" means a web having a structure of individual fibers or threads which are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

The term "microfibers" means small diameter fibers having an average diameter not greater than about 30 microns, for example, having an average diameter of from about 1 micron to about 20 microns, or more particularly, microfibers may have an average diameter of from about 0.5 micron to about 10 microns. Another frequently used expression of fiber diameter is denier, which is defined as grams per 9000 meters of a fiber. For a fiber having circular cross-section, denier may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex," which is defined as the grams per kilometer of fiber. Tex may be calculated as denier/9.

The term "spunbond fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. Nos. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average diameters larger than about 7 microns, more particularly, between about 10 and 30 microns.

The term "meltblown fibers" means fibers formed by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin and in U.S. Pat. No. 6,001,303 to Haynes, et al. Meltblown fibers are microfibers which may be continuous or discontinuous, are generally smaller than 10 microns in diameter, and are generally self bonding when deposited onto a collecting surface. Meltblown fibers used in the present invention are preferably substantially continuous in length.

The term "monocomponent fiber" refers to a fiber formed from one or more extruders using only one polymer. This is not meant to exclude fibers formed from one polymer to which small amounts of additives have been added for color, anti-static properties, lubrication, hydrophilicity, etc. These additives, e.g., titanium dioxide for color, are generally present in an amount less than 5 weight percent and more typically about 2 weight percent.

The term "multicomponent filaments or fibers" refers to fibers which have been formed from at least two polymers extruded from separate extruders but spun together to form one fiber. As a particular example of a multicomponent filament or fiber, a "bicomponent filament or fiber" comprises two polymers arranged in substantially constantly positioned distinct zones across the cross-section of the bicomponent fiber and extend continuously along the length of the bicomponent fiber. The configuration of such a bicomponent fiber may be, for example, a sheath/core configuration wherein one polymer is surrounded by another or may be a side-by-side configuration or an "islands-in-the-sea" configuration. Bicomponent fibers are taught in U.S. Pat. No. 5,108,820 to Kaneko et al., U.S. Pat. No. 5,336,552 to Strack et al., and U.S. Pat. No. 5,382,400 to Pike et al., U.S. Pat. No. 5,989,004 to Cook, each of which is incorporated herein in its entirety by reference. For two component fibers, the polymers may be present in ratios of 75/25, 50/50, 25/75 or any other desired ratios. Conventional additives, such as pigments and surfactants, may be incorporated into one or both polymer streams, or applied to the filament surfaces. The term also includes similar fibers or filaments having more than two components.

The term "polymer" includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

The terminology "electret treatment" or "electreting" refers to any process which places a charge in and/or on a dielectric material such as a polyolefin. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to electreting are well known by those skilled in the art. These methods include, for example, thermal, liquid-contact, electron beam and corona discharge methods. One exemplary process for placing a charge on a dielectric material involves the application of a DC corona discharge to the material. An exemplary conventional method of this type is described in detail in U.S. Pat. No. 5,401,446 to Tsai et al. entitled "Method and Apparatus for the Electrostatic Charging of a Web or Film" which issued on Mar. 28, 1995. The entirety of this patent is hereby incorporated herein by reference. This technique involves subjecting a material to a pair of electrical fields wherein the electrical fields have opposite polarities.

The term "through-air bonding" or "TAB" means a process of bonding a nonwoven bicomponent fiber web in which air having a temperature above the melting point of at least one of the polymer components of the web is forced through the web. The air velocity can be between 100 and 500 feet per minute and the dwell time may be as long as 6 seconds. The melting and resolidification of the polymer provides the bonding. The hot air melts the lower melting polymer component and thereby forms bonds between the filaments to integrate the web.

As used herein, the term "low loft multicomponent spunbond layer" refers to a layer of spunbond material having a lower loft relative to a "high loft multicomponent spunbond layer." Low loft layers desirably have a bulk density of at least 0.05 g/cm$^3$, more desirably about 0.08 g/cm$^3$ to about 0.14 g/cm$^3$, still more desirably about 0.10 g/cm$^3$ to about 0.13 g/cm$^3$.

As used herein, the term "high loft multicomponent spunbond layer" refers to a layer of spunbond material having a higher loft relative to a "low loft multicomponent spunbond layer." High loft layers desirably have a bulk density less than 0.05 g/cm$^3$, more desirably about 0.015 g/cm$^3$ to about 0.035 g/cm$^3$, still more desirably about 0.02 g/cm$^3$ to about 0.03 g/cm$^3$.

As used herein, the term "integrated laminate material" refers to a laminate material having at least one multicomponent spunbond layer bonded to at least one microfiber layer to form a cohesive laminate material. Desirably, a meltblown layer of monocomponent or bicomponent fibers is positioned between a low loft bicomponent spunbond layer and a high loft bicomponent spunbond layer and subjected to a through-air bonding process to form a single cohesive laminate material.

As used herein, the term "crimp" refers to a three-dimensional curl or crimp such as, for example, a helical crimp and does not include random two-dimensional waves or undulations in a fiber.

As used herein, the terms "autogenous bonding" and "autogenously bonded" refer to bonding between discrete parts and/or surfaces independently of external additives such as adhesives, solders, mechanical fasteners and the like. As an example, many multicomponent fibers may be autogenously bonded by developing interfiber bonds at fiber contact points without significantly degrading either the web or the fiber structure.

These terms may be defined with additional language in the remaining portions of the specification.

DETAILED DESCRIPTION OF THE PRESENTLY PREFERRED EMBODIMENTS

Figure 1:
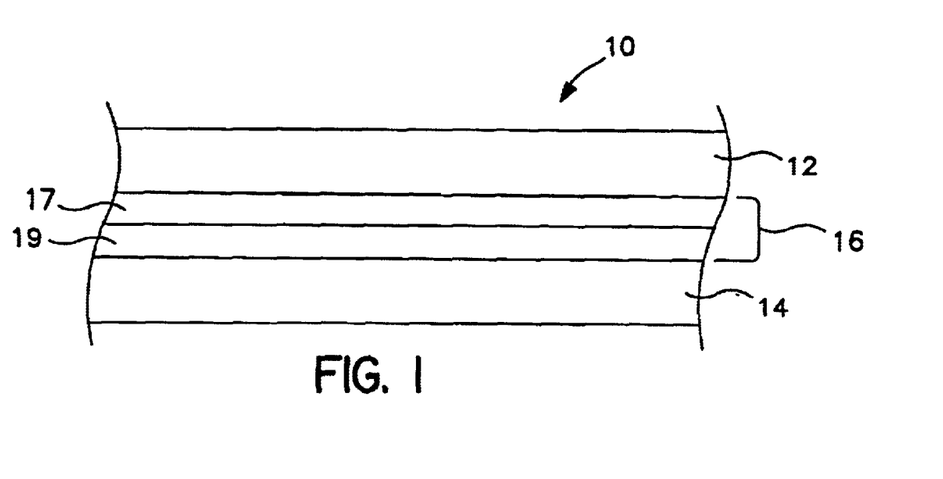
FIG. 1 shows a schematic side view of an integrated nonwoven laminate material, according to one embodiment of this invention.

Referring to FIG. 1, an integrated nonwoven laminate material 10 includes a low loft multicomponent spunbond layer 12, a high loft multicomponent spunbond layer 14, and a microfiber layer 16 disposed between the low loft multicomponent spunbond layer 12 and the high loft multicomponent spunbond layer 14. Desirably, the low loft multicomponent spunbond layer 12 and the high loft multicomponent spunbond layer 14 comprise bicomponent spunbond fibers. The integrated nonwoven laminate material 10 should have an overall bulk density of about 0.015 grams/cm$^3$ to about 0.049 grams/cm$^3$, desirably about 0.025 grams/cm$^3$ to about 0.030 grams/cm$^3$. Desirably, the overall basis weight of the integrated nonwoven laminate material 10 may range from about 75–374 grams per square meter (gsm), more desirably about 100–225 gsm. The basis weight of each layer 12, 14, 16 as well as the size of the fibers used to produce each layer 12, 14, 16 may be varied to produce the integrated nonwoven laminate material 10 with desired filtration properties.

The integrated nonwoven laminate material 10 produced in accordance with this invention is particularly useful as a filtration medium, for example as a pocket bag filter having an ASHRAE Standard 52.1-1992 Dust Spot Efficiency of about 40% to about 95% and an ASHRAE Standard 52.2-1999 MERV (Minimum Efficiency Reporting Value) of 12 to 16.

The low loft multicomponent spunbond layer 12 provides support and strength as well as filtration efficiency to the integrated nonwoven laminate material 10. The low loft multicomponent spunbond layer 12 has multicomponent fibers which are not crimped. As a result, the low loft multicomponent spunbond layer 12 has a lower loft relative to the high loft multicomponent spunbond layer 14. Desirably, the low loft multicomponent spunbond layer 12 has a basis weight of about 33–170 gsm, more desirably about 67–102 gsm. It is also desirable that the low loft multicomponent spunbond layer 12 has a bulk density of at least 0.05 g/cm$^3$, more desirably about 0.08 g/cm$^3$ to about 0.14 g/cm$^3$, still more desirably about 0.10 g/cm$^3$ to about 0.13 g/cm$^3$. In accordance with one embodiment of this invention, the low loft multicomponent spunbond layer 12 has a basis weight of about 15 percent to about 60 percent, more desirably about 20 percent to about 50 percent of the overall basis weight of the integrated nonwoven laminate material 10. It is also desirable that the multicomponent spunbond fibers have a diameter of about 10 microns to about 30 microns, more desirably about 15 microns to about 20 microns.

In accordance with one embodiment of this invention, the low loft multicomponent spunbond layer 12 may be produced by passing a plurality of multicomponent spunbond fibers through a cold air drawing unit. During this process, the multicomponent spunbond fibers are not crimped and thus, a spunbond material having a relatively low loft is produced.

It is desirable that the high loft multicomponent spunbond layer 14 have high loft and low pressure drop across it during filtration. To this end, the multicomponent spunbond fibers of the high loft multicomponent spunbond layer 14 are crimped, in order to facilitate both higher loft and better entrapment of particles to provide particulate capacity and extend service life. In accordance with one embodiment of this invention, the high loft multicomponent spunbond layer 14 acts as a prefiltration and dust entrapment layer as air enters the integrated nonwoven laminate material 10 through the high loft multicomponent spunbond layer 14.

In accordance with one embodiment of this invention, the crimped multicomponent spunbond fibers may be produced by a hot air drawing process. The hot air drawing process is taught in U.S. Pat. No. 5,382,400 to Pike et al. and assigned to Kimberly-Clark Corporation, the disclosure of which is incorporated herein by reference. The hot air drawing process is but one method of producing the high loft multicomponent spunbond layer 14. Other methods well known in the art may be used to produce the crimped multicomponent spunbond fibers, for example, as taught in PCT Publication WO 00/28123 to Kimberly-Clark Worldwide, Inc., the disclosure of which is incorporated herein by reference. The crimped multicomponent spunbond fibers produce the high loft multicomponent spunbond layer 14 with a higher loft relative to the low loft multicomponent spunbond layer 12.

Desirably, the high loft multicomponent spunbond layer 14 has a basis weight of about 33–170 gsm, more desirably about 67–102 gsm. It is also desirably that the high loft multicomponent spunbond layer 14 has a bulk density of less than 0.05 g/cm$^3$, more desirably about 0.015 g/cm$^3$ to about 0.035 g/cm$^3$, still more desirably about 0.02 g/cm$^3$ to about 0.03 g/cm$^3$. In accordance with one embodiment of this invention, the high loft multicomponent spunbond layer 14 has a basis weight of about 15 percent to about 80 percent, more desirably about 20 percent to about 70 percent of the overall basis weight of the integrated nonwoven laminate material 10. It is also desirable that the crimped multicomponent spunbond fibers have a diameter of about 10 microns to about 30 microns, more desirably about 17 microns to about 25 microns. In accordance with one embodiment of this invention, the low loft multicomponent spunbond layer 12 has a bulk density of at least about 300% the bulk density of the high loft multicomponent spunbond layer 14, suitably at least about 500%.

Figure 2:
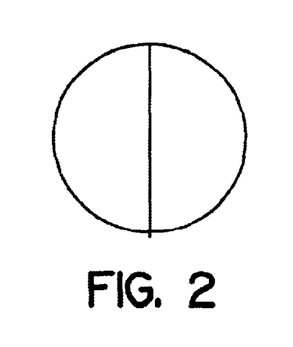
FIG. 2 illustrates a cross-sectional shape of a bicomponent spunbond fiber arranged in a side-by-side configuration, according to one embodiment of this invention.
Figure 3:
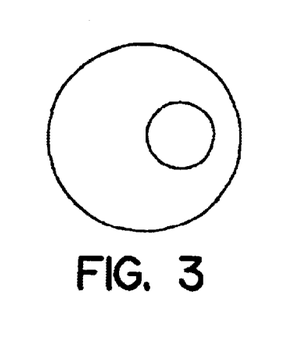
FIG. 3 illustrates a cross-sectional shape of a bicomponent spunbond fiber arranged in a sheath/core configuration, according to one embodiment of this invention.
Figure 4:
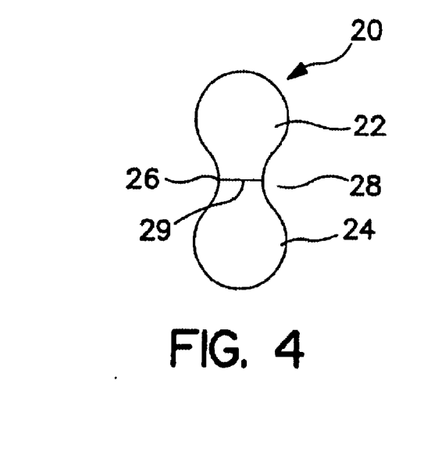
FIGS. 4–9 illustrate cross-sectional shapes of several suitable high loft bicomponent spunbond fibers, according to one embodiment of this invention.

In accordance with one embodiment of this invention, the multicomponent spunbond fibers of the low loft multicomponent spunbond layer 12 and the high loft multicomponent spunbond layer 14 comprise bicomponent spunbond fibers having a lower melting point polymer component and a higher melting point polymer component desirably arranged in a side-by-side configuration, as shown in FIG. 2, or a sheath/core configuration. As shown in FIG. 3, the high loft multicomponent spunbond layer 14 may comprise bicomponent spunbond fibers arranged in an eccentric sheath/core configuration. In eccentric sheath/core fibers, one component fully occludes or surrounds the other component but is asymmetrically located in the fiber to allow fiber crimp. The low loft bicomponent spunbond layer 12 and the high loft bicomponent spunbond layer 14 may be made of the same or similar polymer components. The general technology for producing bicomponent fibers having a side-by-side or sheath/core configuration is well known in the art.

The proportion of higher and lower melting point polymers in the bicomponent fibers can range between about 10–90% by weight higher melting point polymer and 10–90% by weight lower melting point polymer. In practice, only so much lower melting point polymer is needed as will facilitate bonding between the fibers. Thus, a suitable fiber composition may contain about 40–80% by weight higher melting point polymer and about 20–60% by weight lower melting point polymer, desirably about 50–75% by weight higher melting point polymer and about 25–50% by weight lower melting point polymer.

A variety of polymers are suitable for the higher and lower melting point polymer components of the bicomponent fibers. The most suitable polymers will vary depending on the end use filter applications, the methods used to bond the fibers together, the precise fiber shapes and sizes, and other factors. Generally, the lower melting point polymer component may be a polyolefin homopolymer or copolymer. Examples include polyethylene (e.g., low density polyethylene or linear low density polyethylene), propylene-ethylene copolymers having about 10% by weight or more ethylene, other propylene-alpha olefin copolymers having sufficient comonomer content to impart at least some tackiness, syndiotactic polypropylene, blends of atactic and isotactic polypropylene, polybutenes, polypentenes and the like.

The higher melting point polymer component may be a higher melting point polyolefin homopolymer or copolymer. Examples include high density polyethylene, isotactic polypropylene, propylene-ethylene copolymers containing less than 10% ethylene, and other propylene-alpha olefin copolymers having sufficiently low comonomer content so as not to significantly lower the melting point. Other examples of higher melting point polymer components include polyamides, polyesters, polystyrenes, polytetrafluoroethylenes, polyvinyl chlorides, polyurethanes and the like.

The higher and lower melting point polymer components can also be suitable blends which, in the case of the higher melting point polymer component impart structural integrity to the fibers, and in the case of the lower melting point polymer component exhibit suitable interfiber bonding properties. The higher and lower melting point polymer components should have a melting point difference of at least 5° C., desirably at least 10° C., more desirably at least 30° C.

In accordance with one embodiment of this invention, the high loft multicomponent spunbond layer 14 comprises lofted shaped fibers for enhanced dust holding capacity, as shown in FIGS. 4–9. For example, the high loft multicomponent spunbond layer 14 may comprise bilobal bicomponent spunbond fibers 20, as shown in cross-section in FIG. 4. The fiber 20 has two lobes 22 and 24, and depressed regions 26 and 28 on both sides of fiber 20 between the lobes. A boundary line 29 indicates the interface between a higher melting point polymer component forming one of the lobes 22 and 24, and a lower melting point polymer component forming the other lobe. The higher and lower melting point polymer components are arranged in a side-by-side configuration.

Figure 5:
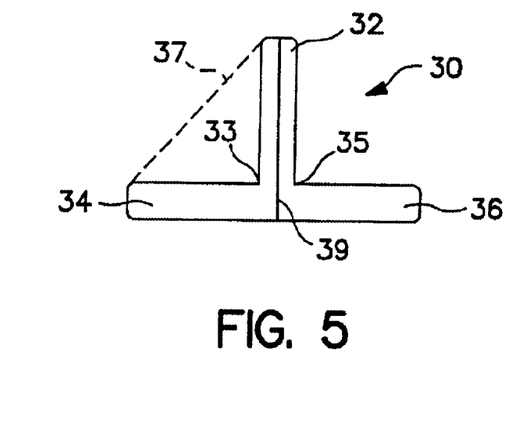

The high loft multicomponent spunbond layer 14 may comprise trilobal bicomponent nonwoven fibers 30 in which the three lobes 32, 34 and 36 are positioned at right angles to each other, as shown in cross-section in FIG. 5. A depressed region 33 is located between the lobes 32 and 34. A depressed region 35 is located between the lobes 32 and 36. It should be apparent from FIG. 5, for instance, that the term "depressed region" refers to a region which is concave with respect to a straight line drawn tangential to the two adjacent lobes. In FIG. 5, a straight line 37 can be drawn tangential to adjacent lobes 32 and 34, with concave portion 33 underneath the straight line. A similar straight line can be drawn tangential to adjacent lobes 32 and 36. However, no concave region exists with respect to a straight line drawn tangential to adjacent lobes 34 and 36. In FIG. 5, a dividing line 39 represents an interface between a lower melting point polymer component forming half of the fiber, and a higher melting point polymer component forming the other half of the fiber. Again, the higher and lower melting point polymer components are arranged in a side-by-side configuration.

Figure 6:
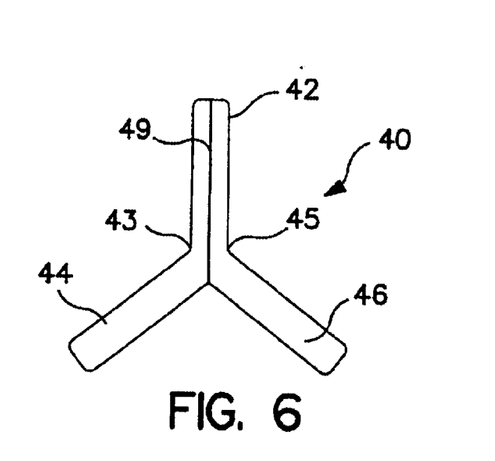

As shown in cross-section in FIG. 6, the high loft multicomponent spunbond layer 14 may comprise trilobal bicomponent nonwoven fibers 40 in which the three lobes 42, 44 and 46 are positioned at 60-degree angles to each other. A depressed region 43 is located between lobes 42 and 44. A depressed region 45 is located between lobes 42 and 46. A depressed region 47 is located between lobes 44 and 46. A dividing line 49 represents an interface between a lower melting point polymer component forming half of the fiber 40, and a higher melting point polymer component forming the other half. The fiber 40 has a side-by-side configuration.

Figure 7:
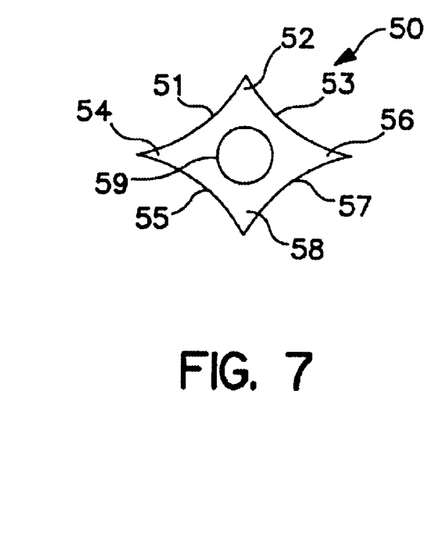

FIG. 7 illustrates, in cross-section, a quadrilobal bicomponent fiber 50 in which the four lobes 52, 54, 56 and 58 are arranged in a star-like configuration. Depressed regions 51, 53, 55 and 57 are formed between each pair of adjacent lobes. A generally circular dividing line 59 represents an interface between a lower melting point polymer component and a higher melting point polymer component. In this instance, the bicomponent fiber has a sheath/core configuration with the higher melting point polymer component forming the core and the lower melting point polymer component forming the sheath.

Figure 8:
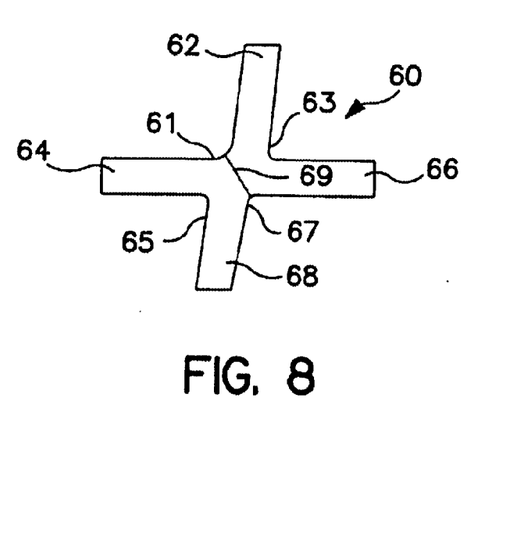

FIG. 8 illustrates, in cross-section, a quadrilobal bicomponent fiber 60 in which the four lobes 62, 64, 66 and 68 are arranged in a cross configuration. Depressed regions 61, 63, 65 and 67 are formed between each pair of adjacent lobes. A dividing line 69 represents the interface between the higher and lower melting point polymer components, which are arranged in a side-by-side configuration.

Figure 9:
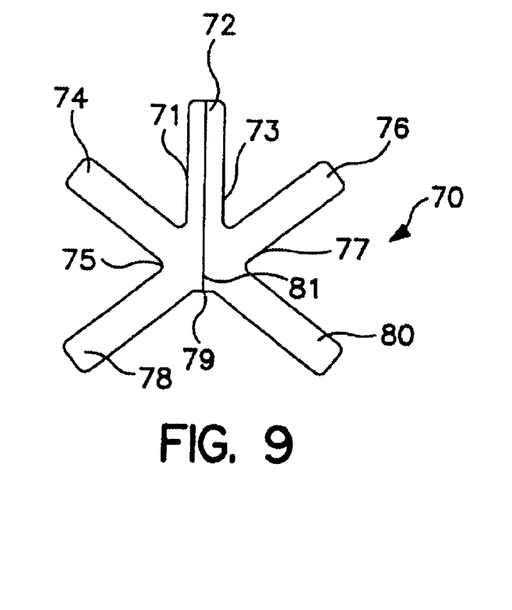

FIG. 9 illustrates, in cross-section, a pentalobal bicomponent fiber 70 having five lobes 72, 74, 76, 78 and 80 arranged at approximately 72-degree angles to each other.

Depressed regions 71, 73, 75, 77 and 79 are formed between each pair of adjacent lobes. A dividing line 81 represents the interface between the higher and lower melting point polymer components which are arranged in a side-by-side configuration.

In accordance with one embodiment of this invention, the integrated nonwoven laminate material 10 has at least one microfiber layer 16. Desirably, the integrated nonwoven laminate material 10 has one microfiber layer 16 disposed between the low loft multicomponent spunbond layer 12 and the high loft multicomponent spunbond layer 14. The microfiber layer 16 provides the integrated nonwoven laminate material 10 with a higher filtration efficiency by entrapping relatively small particles. The microfiber layer 16 is characterized in that it contains relatively closely distributed microfibers. Particularly desirable nonwoven webs for the microfiber layer 16 are meltblown fiber webs of monocomponent fibers, for example polypropylene, or bicomponent fibers, for example polypropylene and polyethylene. Certain bicomponent fibers have a tendency to split to produce multiple smaller fibers, particularly bicomponent fibers comprising polymer components which have a strong affinity towards one another. For example, a bicomponent fiber having a diameter of about 2.0 microns may split into two fibers having a diameter of about 1.0 micron. As a result of the increase in the number of fibers, the microfiber layer 16 is capable of capturing or entrapping relatively smaller particles, thus further increasing filtration efficiency.

Desirably, the microfiber layer 16 has a basis weight of about 10–34 gsm, more desirably about 13.5–20.5 gsm. It is also desirable that the microfiber layer 16 has a bulk density of at least 0.05 g/cm$^3$, more desirably about 0.08 g/cm$^3$ to about 0.14 g/cm$^3$, still more desirably about 0.10 g/cm$^3$ to about 0.13 g/cm$^3$. In accordance with one embodiment of this invention, the microfiber layer 16 has a basis weight of about 5 percent to about 70 percent, more desirably about 5 percent to about 60 percent of the overall basis weight of the integrated nonwoven laminate material 10. It is also desirable that the microfiber layer 16 is made of monocomponent and/or bicomponent fibers having a diameter of about 0.5 micron to about 10 microns.

The microfiber layer 16 of the integrated nonwoven laminate material 10 can be produced from a wide-variety of thermoplastic polymers that are electretizable and form a highly durable electret. Particularly suitable electretizable polymers include, but are not limited to, polyolefins such as the polyolefins discussed above. Desirably, the microfiber layer is polypropylene, PET, PBT or fiberglass.

In accordance with one embodiment of this invention, the microfiber layer 16 comprises a dual layer fiber web having a barrier layer 17 and a bulky layer 19, as shown in FIG. 1. The dual layer fiber web results in a density gradient across the microfiber layer 16. Desirably, the barrier layer 17 has a basis weight of about 5 percent to about 100 percent of the overall basis weight of the microfiber layer 16. It is also desirable that the barrier layer 17 is made of monocomponent or bicomponent fibers having a diameter of about 0.5 micron to about 5.0 microns. Desirably, the bulky layer 19 has a basis weight of up to about 95 percent of the overall basis weight of the microfiber layer 16. It is also desirable that the bulky layer 19 is made of monocomponent or bicomponent fibers having a diameter of about 3.0 microns to about 10 microns.

In accordance with one embodiment of this invention, the microfiber layer 16 comprises a micro-fiberglass material. Desirably, the micro-fiberglass material includes fiberglass fibers having a diameter of about 0.5 micron to about 3.0 microns, more desirably about 0.5 micron to about 1.0 micron.

Figure 10:
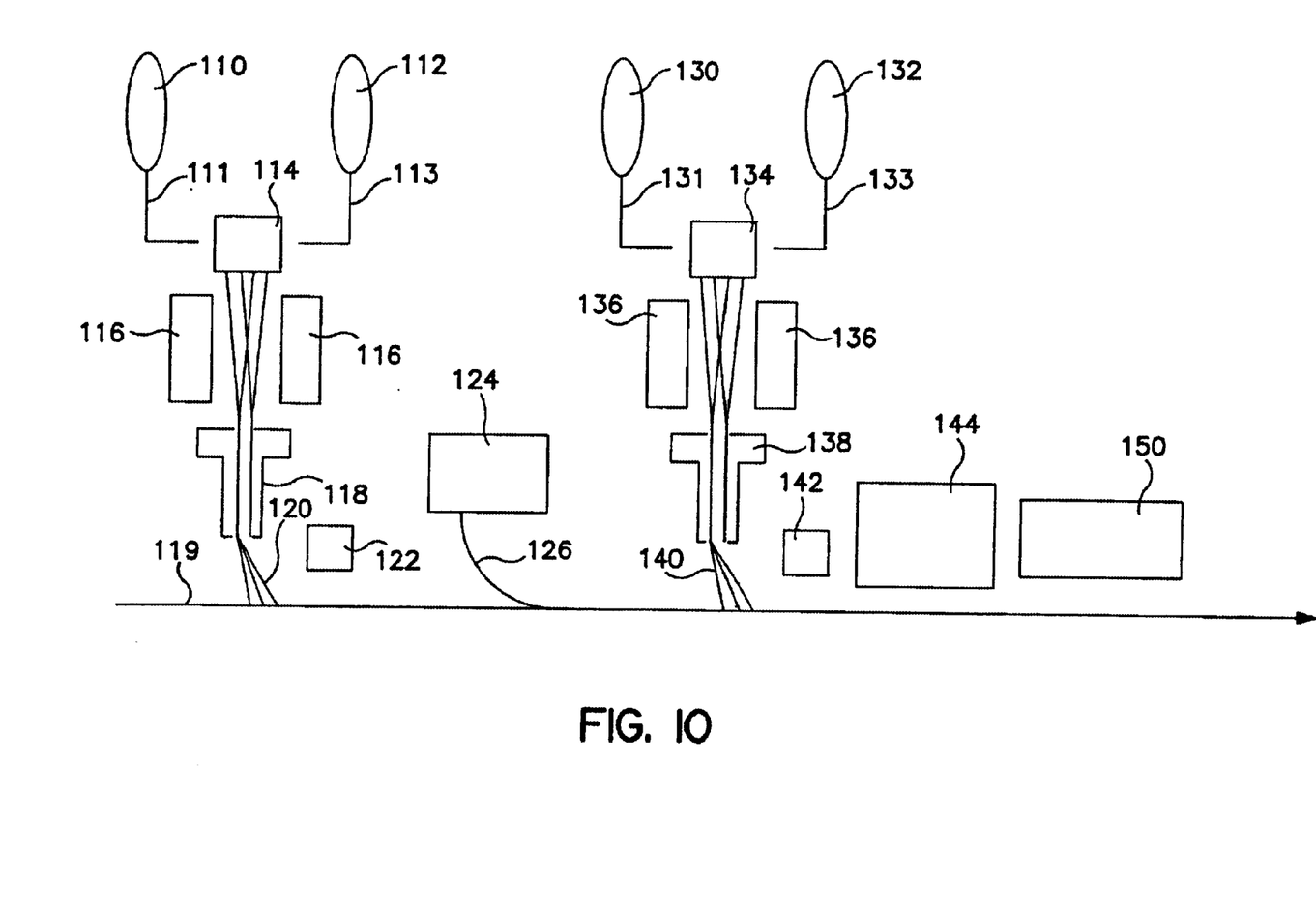
FIG. 10 illustrates schematically a method of producing an integrated nonwoven laminate material, according to one embodiment of this invention.

Referring to FIG. 10, to produce an integrated nonwoven laminate material 10 in accordance with one embodiment of this invention, a low loft multicomponent spunbond layer, desirably a low loft bicomponent spunbond layer 120, is formed. A lower melting point polymer component, for example polyethylene, is extruded from a first extruder 110 and a higher melting point polymer component, for example polypropylene, is extruded from a second extruder 112. The lower melting point polymer component and the higher melting point polymer component enter a spinpack 114 via separate passages 111 and 113 communicating with the extruders 110 and 112, respectively. Within the spinpack 114, the lower and higher melting point polymer components are converted into a plurality of bicomponent spunbond fibers which are extruded through spinnerette openings in a die plate (not shown) of the spinpack 114. The general technology for converting two polymer component streams into bicomponent fibers having a side-by-side or sheath/core arrangement is known in the art, and will not be described in detail here.

The bicomponent spunbond fibers are quenched (rapidly cooled) 116 and drawn through a cold fiber draw unit 118 onto a conveying surface 119 to produce the low loft bicomponent spunbond layer 120. Desirably, the cold fiber draw unit 118 has a drawing air temperature of about 60° F. to about 150° F.

A hot air knife 122 is used to bond the individual bicomponent spunbond fibers together at various locations so that the low loft bicomponent spunbond layer 120 has increased strength and structural integrity and stiffness for subsequent treatments, such as passage through a through-air bonding unit 144. A conventional hot air knife includes a mandrel with a slot that blows a jet of hot air onto the low loft bicomponent spunbond layer 120. Such hot air knives are taught, for example, by U.S. Pat. No. 5,707,468 to Arnold et al., which is incorporated herein by reference.

A microfiber layer 126 is extruded from a third extruder 124 and deposited onto the low loft bicomponent spunbond layer 120. Desirably, the microfiber layer 126 is a meltblown web formed directly on the low loft bicomponent layer 120 as an in-line process. Alternatively, the microfiber layer 126, for example a micro-fiberglass material, may be unwound from a supply roll (not shown) onto the low loft bicomponent spunbond layer 120.

A high loft multicomponent spunbond layer, desirably a high loft bicomponent spunbond layer 140, is deposited or formed on the microfiber layer 126 so that the microfiber layer 126 is disposed between the low loft bicomponent spunbond layer 120 and the high loft bicomponent spunbond layer 140. A lower melting point polymer component, for example polyethylene, is extruded from a fourth extruder 130 and a higher melting point polymer component, for example polypropylene, is extruded from a fifth extruder 132 into a second spinpack 134 via separate passages 131 and 133 communicating with the extruders 130 and 132, respectively. Within the second spinpack 134, the lower and higher melting point polymer components are converted into a plurality of bicomponent spunbond fibers which are extruded through spinnerette openings in a die plate (not shown) of the second spinpack 134.

The bicomponent spunbond fibers are at least partially quenched 136 so that the bicomponent spunbond fibers have latent crimpability and are drawn through a hot fiber draw unit 138. Desirably, the hot fiber draw unit 138 has a drawing air temperature of about 200° F. to about 370° F. As a result of applying heat to the bicomponent spunbond fibers in the hot fiber draw unit 138, the latent crimpability of the bicomponent spunbond fibers is activated and the bicomponent spunbond fibers are crimped, thus producing high loft bicomponent spunbond fibers. The crimped bicomponent spunbond fibers are deposited onto the microfiber layer 126 positioned on the conveying surface 119 to produce the high loft bicomponent spunbond layer 140. Generally, a higher drawing air temperature within the hot fiber draw unit 138 results in a higher number of crimps, provided that the temperature is not so high as to heat the fibers to a temperature above the melting point of the lower melting point polymer component.

Subsequently, a hot air knife 142 bonds the individual high loft bicomponent spunbond fibers together at various locations so that the high loft bicomponent spunbond layer 140 has increased strength and structural integrity for subsequent treatments, such as passage through the through-air bonding unit 144.

The nonwoven laminate material comprising the microfiber layer 126 disposed between the low loft bicomponent spunbond layer 120 and the high loft bicomponent spunbond layer 140 is passed through the through-air bonding unit 144, wherein the fibers within each layer are autogenously bonded to other fibers within the layer and with fibers within adjacent layers. Within the through-air bonding unit 144, the nonwoven laminate material is heated to a temperature above the melting point of the lower melting point polymer component but below the melting point of the higher melting point polymer component, thereby causing the bicomponent fibers of adjacent layers to form interfiber bonds. The through-air bonding unit 144 effects interfiber bonds by thoroughly and evenly heating the nonwoven laminate material with a penetrating flow of forced heated air. This autogenous bonding process produces a single, cohesive integrated nonwoven laminate material 10 having a generally uniform thickness. Unlike conventional laminate materials wherein adjacent layers are bonded together using conventional processes, for example point bonding, the integrated nonwoven laminate material 10 does not have regions which are compacted or compressed as a result of the bonding process. Thus, the pressure drop along the integrated nonwoven laminate material 10 is uniform and unaffected by the bonding process. The resulting integrated nonwoven laminate material 10 is particularly suitable for use as a filter medium.

In order to increase the attraction between particles being filtered and the filter fibers, the integrated nonwoven laminate material 10 may be electret treated (electretized), using conventional techniques as taught in U.S. Pat. No. 5,401,446 to Tsai et al., U.S. Pat. No. 4,215,682 to Kubik et al., U.S. Pat. No. 4,375,718 to Wadsworth et al., and U.S. Pat. No. 4,588,537 to Klaase et al., the disclosures of which are incorporated herein by reference. One or all of the layers may be electret treated prior to the formation of the integrated nonwoven laminate material 10 or the integrated nonwoven laminate material 10 may be electret treated subsequent to formation.

One or more additives known in the art can be added to the multicomponent spunbond fibers to improve charge formation and/or retention. For example, electret charge stability can be further enhanced by grafting polar end groups (telomer, maleic anhydride, polyacrylic acids, and the like) onto the polymers in the bicomponent spunbond fibers. Also, barium titanate and other polar materials can be blended with the polymers. Suitable blends are described, for instance, in PCT Publication WO 97/44509 to Turkevich et al., and in PCT Publication WO 00/00267 to Myers et al.

In accordance with one embodiment of this invention, the microfiber layer 126 is electret treated before it is deposited onto the low loft bicomponent spunbond layer 120. Further, the integrated nonwoven laminate material 10 may be cooled, either actively or passively, by conventional means before the integrated nonwoven laminate material 10 is electret treated. Additional post formation processes 150 may be included in this in-line process, including for example a slit aperturing process and a winding process whereby the integrated nonwoven laminate material 10 is wound onto a supply roll.

TEST PROCEDURES

Ashrae 52.2-1999: Method of Testing General Ventilation Air Cleaning Devices for Removal Efficiency by Particle Size This test, which is a filter industry standard test has a standard procedure which is incorporated by reference. In summary, the test measures the efficiency of a filter medium in removing particles of specific diameter as the filter becomes loaded with standardized loading dust. The loading dust is fed at interval stages to simulate accumulation of particles during service life. The challenge aerosol for filtration efficiency testing is solid-phase potassium chloride (KCl) generated from an aqueous solution. An aerosol generator produces KCl particles in twelve size ranges for filtration efficiency determination. The minimum efficiency observed over the loading sequence for each particle size range is used to calculate composite average efficiency values for three particle size ranges: 0.3 to 1.0 micron, 1.0 to 3.0 microns, and 3.0 to 10 microns.

The loading dust used to simulate particle accumulation in service is composed, by weight, of 72% SAE Standard J726 test dust (fine), 23% powdered carbon, and 5% milled cotton linters. The efficiency of clean filter medium is measured at one of the flow rates specified in the standard. A feeding apparatus then sends a flow of dust particles to load the filter medium to various pressure rise intervals until the specified final resistance is achieved. The efficiency of the filter to capture KCl particles is determined after each loading step. The efficiency of the filter medium is determined by measuring the particle size distribution and number of particles in the air stream, at positions upstream and downstream of the filter medium. The particle size removal efficiency ("PSE") is defined as:

$$PSE = 100 \times \left[1 - \left(\frac{\text{downstream particle count}}{\text{upstream particle count}}\right)\right]$$

The particle counts and size can be measured using a HIAC/ROYCO Model 8000 automatic particle counter and a HIAC/ROYCO Model 1230 sensor.

ANSI/ASHRAE 52.1-1992: Gravimetric and Dust-Spot Procedures for Testing Air-Cleaning Devices Used in General Ventilation for Removing Particulate Matter This test is a filter industry standard test, and has a detailed procedure which is incorporated by reference. In summary, the test measures the efficiency of filter medium in removing atmospheric dust as the filter becomes loaded with a standard, synthetic dust. The dust removal performance is measured in two ways:

1. ASHRAE weight arrestance, measuring the weight percentage of the synthetic dust captured by the filter device.
2. ASHRAE dust-spot efficiency, comparing the blackening of targets upstream and downstream of the filter device when exposed to ambient atmospheric dust.

The dust-spot efficiency of a clean filter device is determined at a specified flow rate. A feeding apparatus then sends a flow of synthetic dust particles to load the filter medium at various pressure rise intervals until the specified final resistance is achieved. The arrestance and dust-spot efficiency are measured after each loading stage. When the final resistance is reached, the average arrestance, average dust-spot, and dust-holding capacity are calculated. The dust-holding capacity is the total weight of the dust increments multiplied by the average arrestance. The loading dust used to simulate particle accumulation in service is composed, by weight, of 72% SAE Standard J726 test dust (fine), 23% powdered carbon, and 5% milled cotton linters.

Method of Determining Bulk Density

Fabric thickness can be determined in accord with ASTM Standard Test Method D 5729-95 measured under a 0.05 psi load and a 3 inch circular platen. The fabric thickness and basis weight of the fabric are used to calculate the fabric density.

EXAMPLE

Eight pocket bag filters (24"×24"×22") were produced with a 5.0 osy integrated nonwoven laminate material having a meltblown microfiber layer positioned between a low loft bicomponent spunbond layer and a high loft bicomponent spunbond layer. The integrated nonwoven laminate material has a bulk density of about 0.034 g/cm$^3$ with the following composition:

The low loft bicomponent spunbond layer comprises polypropylene/polyethylene uncrimped bicomponent fibers having a side-by-side configuration with an average diameter of about 17 microns. The low loft bicomponent spunbond layer comprises 36% by weight of the integrated nonwoven laminate material.

The microfiber layer comprises meltblown polypropylene monofilament fibers with an average diameter of about 2.0 microns. The microfiber layer comprises 8.6% by weight of the integrated nonwoven laminate material.

The high loft bicomponent spunbond layer comprises polypropylene/polyethylene crimped bicomponent fibers having a side-by-side configuration with an average diameter of about 23 microns. The high loft bicomponent spunbond layer comprises 55.4% by weight of the integrated nonwoven laminate material.

The integrated nonwoven laminate material has a TSI 8110 penetration of 4.9% (NaCl@0.1 microns as the challenged aerosol) with a pressure drop of 1.9 mm water when tested at 32 liters per minute flow rate.

ASHRAE characterization of the pocket bag filters yielded the following results:

ASHRAE 52.1 Testing

| | |
|---|---|
| Flow Rate (cfm) | 2,000 |
| Initial Resistance (inches W.G.) | 0.43 |
| Final Resistance (inches W.G.) | 1.00 |
| Initial Dust Spot Efficiency | 71.8% |
| Average Dust Spot Efficiency | 75.8% |
| Average Synthetic Dust Weight Arrestance | 100% |
| Dust Holding Capacity, grams | 128 @ 1.0 inch W.G. |

As a result of the testing, the pocket bag filters are classified as 75% ASHRAE bag filters. The filter efficiency can be increased or decreased by changing the amount (by weight) of the microfiber layer.

ASHRAE 52.2 Testing

| | |
|---|---|
| Test Flow Rate (cfm) | 2,000 |
| Initial Resistance (inches W.G.) | 0.224 |
| Final Resistance (inches W.G.) | 1.00 |
| Minimum Efficiency Reporting Value (MERV) | 14 @ 2,000 cfm |
| Minimum Average Efficiency 0.3 to 1.0 micron (E1) | 78.8% |
| Minimum Average Efficiency 1.0 to 3.0 microns (E2) | 93% |
| Minimum Average Efficiency 3.0 to 10.0 microns (E3) | 97.3% |

W.G. - pressure drop in inches of water gauge

The discrepancy in Initial Resistance is a result of a first test lab performing the 52.1 testing and a second test lab performing the 52.2 testing. The 0.224" W.G. value is believed to be more accurate.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. An integrated nonwoven laminate material, comprising:
    a low loft multicomponent spunbond layer having a bulk density of at least 0.05 g/cm$^3$;
    a high loft multicomponent spunbond layer having a bulk density less than 0.05 g/cm$^3$; and
    a microfiber layer between the low loft multicomponent spunbond layer and the high loft multicomponent spunbond layer having a bulk density of at least 0.05 g/cm$^3$,
    wherein the microfiber layer comprises a meltblown nonwoven web.

2. The integrated nonwoven laminate material of claim 1, wherein the low loft multicomponent spunbond layer and the high loft multicomponent spunbond layer comprise bicomponent spunbond fibers.

3. The integrated nonwoven laminate material of claim 2, wherein the bicomponent spunbond fibers comprise a lower melting point polymer component selected from the group consisting of polyethylene, propylene-ethylene copolymers, propylene-alpha olefin copolymers, syndiotactic polypropylene, blends of atactic and isotactic polypropylene, polybutenes and polypentenes.

4. The integrated nonwoven laminate material of claim 2, wherein the bicomponent spunbond fibers comprise a higher melting point polymer component selected from the group consisting of high density polyethylene, isotactic polypropylene, propylene-ethylene copolymers, propylene-alpha olefin copolymers, polyamides, polyesters, polystyrenes, polytetrafluoroethylenes, polyvinyl chlorides and polyurethanes.

5. The integrated nonwoven laminate material of claim 2, wherein a lower melting point polymer component of each bicomponent spunbond fiber comprises polyethylene.

6. The integrated nonwoven laminate material of claim 2, wherein a higher melting point polymer component of each bicomponent spunbond fiber comprises polypropylene.

7. The integrated nonwoven laminate material of claim 2, wherein each bicomponent spunbond fiber has a side-by-side configuration.

8. The integrated nonwoven laminate material of claim 2, wherein each bicomponent spunbond fiber has an eccentric sheath/core configuration.

9. The integrated nonwoven laminate material of claim 1, wherein the microfiber layer comprises a material selected from the group consisting of polypropylene, PET, PBT and fiberglass.

10. The integrated nonwoven laminate material of claim 1, wherein the integrated nonwoven laminate material has an overall bulk density of about 0.015 g/cm³ to about 0.049 g/cm³.

11. The integrated nonwoven laminate material of claim 1, wherein the integrated nonwoven laminate material has an overall bulk density of about 0.025 g/cm³ to about 0.030 g/cm³.

12. The integrated nonwoven laminate material of claim 1, wherein the low loft multicomponent spunbond layer has a bulk density of about 0.08 g/cm3 to about 0.14 g/cm³.

13. The integrated nonwoven laminate material of claim 1, wherein the low loft multicomponent spunbond layer has a bulk density of about 0.10 g/cm³ to about 0.13 g/cm³.

14. The integrated nonwoven laminate material of claim 1, wherein the microfiber layer has a bulk density of about 0.08 g/cm³ to about 0.14 g/cm³.

15. The integrated nonwoven laminate material of claim 1, wherein the microfiber layer has a bulk density of about 0.10 g/cm³ to about 0.13 g/cm³.

16. The integrated nonwoven laminate material of claim 1, wherein the high loft multicomponent spunbond layer has a bulk density of about 0.015g/cm³ to about 0.035 g/cm³.

17. The integrated nonwoven laminate material of claim 1, wherein the high loft multicomponent spunbond layer has a bulk density of about 0.02 g/cm³ to about 0.03 g/cm³.

18. The integrated nonwoven laminate material of claim 1, wherein the low loft multicomponent spunbond layer has a bulk density of at least about 300% a bulk density of the high loft multicomponent spunbond layer.

19. The integrated nonwoven laminate material of claim 1, wherein the low loft bicomponent spunbond layer has a bulk density of at least about 500% a bulk density of the high loft bicomponent spunbond layer.

20. A filter comprising the integrated nonwoven laminate material of claim 1.

21. The filter of claim 20, having an ASHRAE Standard 52.1-1992 Dust Spot Efficiency of about 40% to about 95%.

22. The filter of claim 20, having an ASHRAE Standard 52.2-1999 MERV of 12 to 16.

23. The integrated nonwoven laminate material of claim 1, wherein the low loft multicomponent spunbond layer comprises a plurality of multicomponent fibers substantially void of crimps.

24. An integrated nonwoven laminate material, comprising:

a low loft multicomponent spunbond layer;

a high loft multicomponent spunbond layer; and at least one microfiber layer integrated with the low loft multicomponent spunbond layer and the high loft multicomponent spunbond layer having a bulk density of at least 0.05 g/cm³, the microfiber layer comprising a mneltblown nonwoven web, wherein the low loft multicomponent spunbond layer has a bulk density of at least about 300% a bulk density of the high loft multicomponent spunbond layer.

25. The integrated nonwoven laminate material of claim 24, wherein the integrated nonwoven laminate material has an overall basis weight of about 75 gsm to about 374 gsm.

26. The integrated nonwoven laminate material of claim 24, wherein the integrated nonwoven laminate material has an overall basis weight of about 101.7 gsm to about 224.5 gsm.

27. The integrated nonwoven laminate material of claim 24, wherein the low loft multicomponent spunbond layer comprises about 15% to about 60% of an overall basis weight of the integrated nonwoven laminate material.

28. The integrated nonwoven laminate material of claim 24, wherein the low loft multicomponent spunbond layer comprises about 20% to about 50% of an overall basis weight of the integrated nonwoven laminate material.

29. The integrated nonwoven laminate material of claim 24, wherein the microfiber layer comprises about 5% to about 70% of an overall basis weight of the integrated nonwoven laminate material.

30. The integrated nonwoven laminate material of claim 24, wherein the microfiber layer comprises about 5% to about 60% of an overall basis weight of the integrated nonwoven laminate material.

31. The integrated nonwoven laminate material of claim 24, wherein the high loft multicomponent spunbond layer comprises about 15% to about 80% of an overall basis weight of the integrated nonwoven laminate material.

32. The integrated nonwoven laminate material of claim 24, wherein the high loft multicomponent spunbond layer comprises about 20% to about 70% of an overall basis weight of the integrated nonwoven laminate material.

33. The integrated nonwoven laminate material of claim 24, wherein the microfiber layer comprises a barrier layer and a second layer.

34. The integrated nonwoven laminate material of claim 24, wherein the microfiber layer comprises a barrier layer, wherein the barrier layer comprises about 5% to about 100% of a basis weight of the microfiber layer.

35. The integrated nonwoven laminate material of claim 24, wherein the microfiber layer comprises a second layer, wherein the second layer comprises up to about 95% of a basis weight of the microfiber layer.

36. The integrated nonwoven laminate material of claim 24, wherein the low loft multicomponent spunbond layer comprises a plurality of multicomponent fibers substantially void of crimps.

* * * * *